United States Patent
Wallace et al.

(10) Patent No.: US 11,416,677 B2
(45) Date of Patent: Aug. 16, 2022

(54) DYNAMIC RESOURCE MANAGEMENT SYSTEMS AND FORM INTEGRATION METHODS

(71) Applicant: salesforce.com, inc., San Francisco, CA (US)

(72) Inventors: Benjamin Wallace, Indianapolis, IN (US); Neil Brady, Indianapolis, IN (US); Tomasz Piotr Parzadka, Indianapolis, IN (US); Corey Pitzo, Indianapolis, IN (US); Andrew Bostock, Indianapolis, IN (US); Jillian Wilschke, Indianapolis, IN (US); Mariah Mathews, Indianapolis, IN (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/844,495

(22) Filed: Apr. 9, 2020

(65) Prior Publication Data
US 2021/0319171 A1    Oct. 14, 2021

(51) Int. Cl.
| | |
|---|---|
| *G06F 40/18* | (2020.01) |
| *G06F 9/451* | (2018.01) |
| *H04L 67/01* | (2022.01) |
| *G06F 40/117* | (2020.01) |
| *G06F 16/93* | (2019.01) |
| *G06F 16/22* | (2019.01) |
| *G06F 3/0482* | (2013.01) |
| *H04L 67/10* | (2022.01) |

(52) U.S. Cl.
CPC .......... *G06F 40/18* (2020.01); *G06F 3/0482* (2013.01); *G06F 9/451* (2018.02); *G06F 16/22* (2019.01); *G06F 16/93* (2019.01); *G06F 40/117* (2020.01); *H04L 67/42* (2013.01); *H04L 67/10* (2013.01)

(58) Field of Classification Search
CPC .................................................... G06F 40/18
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |

(Continued)

*Primary Examiner* — James J Debrow
(74) *Attorney, Agent, or Firm* — LKGlobal | Lorenz & Kopf, LLP

(57) ABSTRACT

Computing systems, database systems, and related methods are provided for supporting dynamic resources. One exemplary method involves generating a graphical representation of a document on a client device communicatively coupled to the server over a network, receiving indication to add a form to the document, generating one or more graphical user interface elements manipulable to define one or more fields of the form within the graphical representation of the document in response to the indication, receiving metadata defining the one or more fields of the form via the one or more graphical user interface elements, and storing the metadata defining the one or more fields of the form in a database in association with a document object corresponding to the document.

20 Claims, 9 Drawing Sheets

(56) References Cited

U.S. PATENT DOCUMENTS

| | | |
|---|---|---|
| 5,821,937 A | 10/1998 | Tonelli. et al. |
| 5,831,610 A | 11/1998 | Tonelli. et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2010/0076946 A1* | 3/2010 | Barker et al. ............ G06F 17/30 |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0204840 A1* | 8/2013 | Jarvis et al. ............ G06F 17/30 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0082033 A1* | 3/2014 | Meriwether ............ G06F 17/30 |
| 2017/0199861 A1* | 7/2017 | Zia et al. ............... G06F 17/246 |
| 2018/0165851 A1* | 6/2018 | Apte et al. ............. G06T 11/60 |
| 2018/0247243 A1* | 8/2018 | Moolman et al. ...... G06Q 10/06 |
| 2019/0129929 A1* | 5/2019 | Neylan et al. ......... G06F 17/246 |
| 2020/0110796 A1* | 4/2020 | Tsabba ................... G06F 17/24 |

\* cited by examiner

DYNAMIC RESOURCE MANAGEMENT SYSTEMS AND FORM INTEGRATION METHODS

TECHNICAL FIELD

Embodiments of the subject matter described herein relate generally to database systems, and more particularly, to methods and systems that support dynamic documents, files, or other resources in a database system.

BACKGROUND

Modern software development is evolving away from the client-server model toward network-based processing systems that provide access to data and services via the Internet or other networks. In contrast to traditional systems that host networked applications on dedicated server hardware, a "cloud" computing model allows applications to be provided over the network "as a service" or "on-demand" by an infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

Cloud-based architectures and file hosting services have been developed to improve collaboration, integration, and cooperation among users. However, integrating or managing data across different types of files often remains a manually intensive task that requires an undesirable amount of time and can be prone to duplicate efforts, such as, for example, entering information in multiple locations, copying and pasting information, and the like. For example, a user who desires to create a survey or form relevant to a collaborative file or object maintained in a database and then subsequently distribute the survey or form and manage or analyze the response data from multiple different respondents often has to manually create an independent standalone form that can become stale as changes occur with respect to the file or database object, and may require the user to manually inspect and update the form and manage multiple different versions of a given form. Accordingly, it is desirable to provide methods and systems for integrating data across different files in a more automated manner that improves collaboration and reduces the time and effort required by individual users.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIGS. 3-5 depict an exemplary sequence of graphical user interface (GUI) displays illustrating the form creation process of FIG. 2 in accordance with one or more exemplary embodiments;

FIG. 8 depicts an exemplary spreadsheet GUI display suitable for presentation within the computing system in connection with the form creation process of FIG. 2 and the form presentation process of FIG. 6 in accordance with one or more exemplary embodiments.

DETAILED DESCRIPTION

Figure 1:
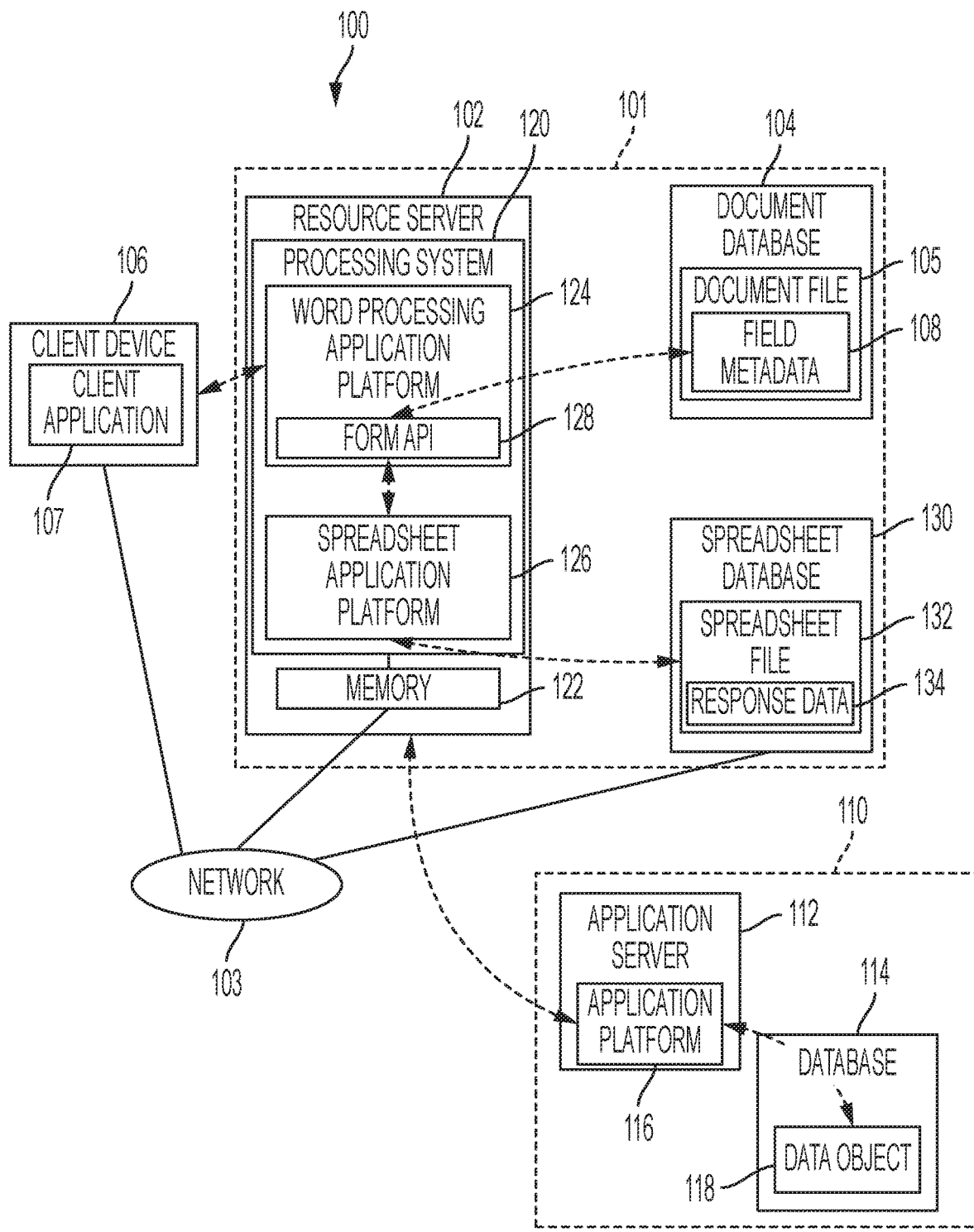
FIG. 1 is a block diagram of an exemplary computing system.

Embodiments of the subject matter described herein generally relate to methods and systems for managing dynamic electronic files or other resources. For purposes of explanation, the subject matter may be described herein in the context of electronic document files; however, the subject matter is not limited to electronic document files and may be employed in an equivalent manner for other types of electronic files (e.g., spreadsheet files, presentation files, and the like).

In one or more embodiments, a document management system includes a document server coupled to a document database that stores or otherwise maintains data for generating graphical representations of electronic document files within instances of a word processing application provided to client computing devices. When a user of a client device indicates a desire to open or view a document within the word processing application, the document server obtains the document data from the document database and generates or otherwise provides a graphical representation of the document on the client device within the word processing application. In exemplary embodiments described herein, an application program interface (API) or similar feature is integrated into the word processing application to allow for forms to be integrated within the body of a document. In this regard, the metadata defining the fields or structure of the form are integrated with or otherwise encoded into the document file, such that when generating the visualization of the document for a document recipient or respondent, the document server identifies form field metadata within the document and generates graphical user interface (GUI) elements and other text or images to provide the configured form within the body of the document in accordance with the form field metadata.

As described in greater detail below in the context of FIG. 2, in exemplary embodiments, the form API is triggered or otherwise initiated in response to receiving a user indication to add the form within a body of a document being presented by the word processing application platform. The form API causes the word processing application platform to generate a form building GUI display that includes GUI elements that are manipulable by the user to define the characteristics or attributes of the form to be added to the document. For example, the GUI elements may allow the user to define the number and type of GUI elements to be added to the form to receive user responses (e.g., radio buttons, list boxes, text boxes, drop-down menus, and/or the like), the text or other information defining the various fields of the form to which the users responses pertains, potential response values for individual fields of the form, and/or the like. After receiving metadata defining the various fields and configuration of the form from the user via the GUI elements of the form building GUI display, the form API updates the document object in the document database to store the field metadata in the document database, such that the form field metadata is integrated with the body of the document. For example, the form field metadata may be assigned a unique identifier associated with the document to thereby maintain an association between the form field metadata and the document to which it belongs. In exemplary embodiments, the form API also automatically communicates or otherwise interacts with a spreadsheet application platform to create and configure a new spreadsheet object in a spreadsheet database for maintaining the user responses subsequently received via the form that was added to the document. In this regard, the columns of the spreadsheet correspond to the different fields or GUI elements of the form, where the rows of the spreadsheet corresponding to the different form respondents.

Figure 3:
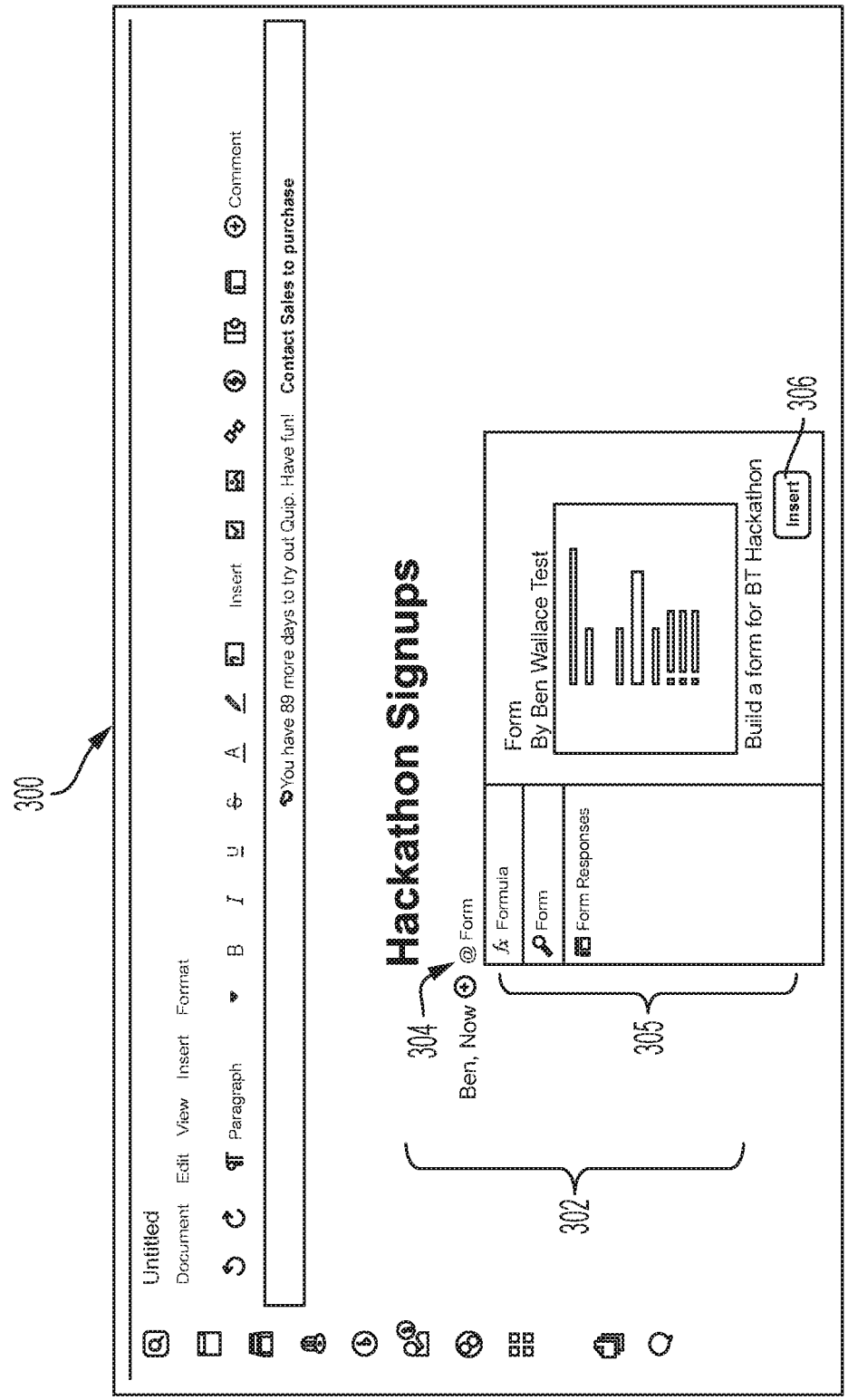

As described in context of FIG. 3, when another user attempts to view the created document that includes a form, the word processing application platform obtains the corresponding document object from the database and generates a graphical representation of the document on that user's client device. In this regard, when the word processing application platform identifies the form field metadata within the document, the form API is triggered to generate a form GUI display within the document that includes the form GUI elements configured by the user who created the form. In this regard, the form GUI display is positioned within the text or body of the document at the location in the document where the user who created the form added the form to the document. The responding user may manipulate or otherwise utilize the form GUI elements to input response values for the various fields of the form. In response to receiving the input values for the various fields of the form, the form API automatically communicates or otherwise interacts with a spreadsheet application platform to create a new row or entry in the spreadsheet object corresponding to the document to maintain the input response values. For example, the form API may automatically interact with the spreadsheet application platform to add a new row to the spreadsheet object corresponding to the document and then populate the columns of the new row with the input values received via the form GUI elements. In this manner, the spreadsheet may be dynamically updated and substantially in real-time as response data is received. The user who originally created the form can utilize the associated spreadsheet object to review, track and analyze response data.

FIG. 1 depicts an exemplary embodiment of a computing system 100 that includes a resource management system 101 capable of supporting integrating forms into dynamic resources 105 for presentation to a user of a client device 106 within an instance of a resource visualization application 124 provided by a resource server 102. The resource server 102 is communicatively coupled to a resource database 104 that stores or otherwise maintains the data corresponding to the resources 105 to be accessed. For purposes of explanation, the subject matter is described herein in the context of the resources as being realized as electronic document files (or simply documents); however, it should be appreciated the subject matter described herein is not limited to documents and may be implemented in an equivalent manner for other types of electronic files. That said, for purposes of explanation, the resource database 104 is alternatively referred to herein as a document database.

In exemplary embodiments, the client device 106 is communicatively coupled to the resource server 102 via a communications network 103, may be realized as any sort or combination of wired and/or wireless computer network, a cellular network, a mobile broadband network, a radio network, the Internet, or the like. The resource server 102 generally represents a server computing device, server computing system or another combination of processing logic, circuitry, hardware, and/or other components configured to support resource visualization and the form integration processes, tasks, operations, and/or functions described herein. In this regard, the resource server 102 includes a processing system 120, which may be implemented using any suitable processing system and/or device, such as, for example, one or more processors, central processing units (CPUs), controllers, microprocessors, microcontrollers, processing cores and/or other hardware computing resources configured to support the operation of the processing system 120 described herein. The processing system 120 may include or otherwise access a data storage element 122 (or memory) capable of storing programming instructions for execution by the processing system 120, that, when read and executed, cause processing system 120 to support the processes described herein. Depending on the embodiment, the memory 122 may be realized as a random access memory (RAM), read only memory (ROM), flash memory, magnetic or optical mass storage, or any other suitable non-transitory short or long term data storage or other computer-readable media, and/or any suitable combination thereof.

In one or more embodiments, the programming instructions cause the processing system 120 to create, generate, or otherwise facilitate a word processing application platform 124 that generates or otherwise provides instances of a word processing application that supports the visualization of electronic document files at run-time (or "on-demand") based at least in part upon code and other data that is stored or otherwise maintained by the memory 122 and/or the database 104. In exemplary embodiments, the processing system 120 is also capable of creating, generating, or otherwise facilitating a spreadsheet application platform 126 that generates or otherwise provides instances of a spreadsheet application that supports the visualization of electronic spreadsheet files maintained as database objects in a spreadsheet database 130. That said, in other embodiments, the resource management system 101 may include additional and/or different servers dedicated to supporting the spreadsheet application platform 126, in which different subsets of server instances may be configured to support a respective one of the word processing application platform 124 or the spreadsheet application platform 126. For purposes of explanation however, the subject matter will be primarily described herein in the context of the word processing application platform 124 and the spreadsheet application platform 126 being implemented at a common server 102. It should also be noted that the subject matter is not limited to word processing or spreadsheets and could be implemented in an equivalent manner for other types of resources or application platforms (e.g., presentation applications), or in the context of a single application platform that supports multiple different types of files or resources.

The client device 106 generally represents an electronic device coupled to the network 103 that may be utilized by a user to access the word processing application platform 124 on the resource server 102 and utilize the virtual word processing application to create, retrieve, view, and/or edit electronic document files 105 from the document database 104 via the network 103. In practice, the client device 106 can be realized as any sort of personal computer, mobile telephone, tablet or other network-enabled electronic device.

In exemplary embodiments, the client device 106 includes a display device, such as a monitor, screen, or another conventional electronic display, capable of graphically presenting data and/or information provided by the application platform 124 along with a user input device, such as a touchscreen, a touch panel, a mouse, a joystick, a directional pad, a motion sensor, or the like, capable of receiving input from the user of the client device 106. The illustrated client device 106 executes or otherwise supports a client application 107 that communicates with the application platform 124 on the resource server 102 using a networking protocol. In some embodiments, the client application 107 is realized as a web browser or similar local client application executed by the client device 106 that contacts the resource server 102 and/or the word processing application platform 124 using a networking protocol, such as the hypertext transport protocol (HTTP) or the like, to access or otherwise initiate an instance of the word processing application presented on the client device 106.

In exemplary embodiments, the document database 104 stores or otherwise maintains electronic document files 105 for viewing or editing with the word processing application supported by the word processing application platform 124. In one or more embodiments, the electronic document files 105 are maintained using document objects maintained in a database table having rows or entries corresponding to respective instances of documents and fields or columns containing the data associated with a respective document. For example, an entry for a document may include a field or column that includes or references the text or other content of the document along with additional fields or columns that maintain other attributes or metadata associated with a particular document, such as, for example, author information, versioning information, and the like.

When a user of the client device 106 selects a document 105 for presentation, the word processing application supported by the word processing application platform 124 retrieves the body or content portion of the document 105 from the appropriate field or column of the entry corresponding to that document 105 and generates a word processor graphical user interface (GUI) display within the client application 107 on the client device 106 that includes a graphical representation of the text of the document 105. As described above and in greater detail below, in exemplary embodiments, a user input provided within the body of a document 105 is detected or otherwise identified by the word processing application platform 124 to trigger or otherwise initiate a form API 128 at the server 102. For example, in one or more embodiments, a user may input "@Form" into the body of the document 105 to cause the word processing application platform 124 to execute the corresponding code or other executable programming instructions stored at the server 102 (e.g., in memory 122) to generate the form API 128 in connection with the instance of the word processing application. In this regard, the word processing application platform 124 may analyze the input text provided within the body of the document 105 to detect an indication of a desire to initiate the form API 128 to add a form to the document 105 in real-time.

As described in greater detail below in the context of FIG. 2, the form API 128 automatically generates a form builder GUI display within the body of the document presented within the word processing GUI display, with the form builder GUI display including GUI elements that allow the user to add and configure additional form-related GUI elements to the body of the document to create and define a form within the document. The user's resulting placement and configuration of the form-related GUI elements results in metadata that characterizes or otherwise defines the fields or other attributes of the form, which, in turn may be stored or otherwise maintained in the document database 104 (e.g., field metadata 108) and encoded or otherwise integrated with the document 105 such that the configured form may be subsequently replicated at the appropriate location within the body of the document with the appropriately configured GUI elements for receiving form responses.

In exemplary embodiments, the document database 104 also stores or otherwise maintains, in association with the document 105 and/or the field metadata 108, an indication of the user who created or otherwise defined the form to support role-based presentation of the form, as described in greater detail below. In this regard, different users may be designated with different roles or permissions with respect to the form such that they are able to modify the configuration of the form, view form responses, and/or the like, while other users having different roles or permissions may be limited to submitting responses via the form. Thus, when the word processing application platform 124 presents a visualization of the document 105 for a user who did not create the form or otherwise lacks permissions to edit or modify the form, the form API 128 renders the GUI elements of the configured form in accordance with the field metadata 108 within the body of the document 105 at the appropriate location where the form was placed or otherwise located relative to the remaining text or content of the document 105 by the creating user.

As described in greater detail below in the context of FIG. 3, when other users attempt to retrieve or access the document 105, the word processing application platform 124 automatically detects or otherwise identifies the form field metadata 108 associated with the document 105 and automatically initiates or otherwise triggers the form API 128 in real-time to generate a graphical representation of the configured form GUI elements in accordance with the field metadata 108. Thereafter, those users may manipulate, select, or otherwise interact with the form GUI elements within the body of the document 105 to input or otherwise provide responses to the form. In exemplary embodiments, upon saving or exiting the document 105, the form API 128 automatically communicates or interacts with the spreadsheet application platform 126 to store an individual respondent's response data in an electronic spreadsheet file 132 in the spreadsheet database 130. In some embodiments, the form API 128 may also store or otherwise maintain an individual's response data in the document database 104 in association with the document 105 and the individual user (e.g., using a unique identifier assigned to the user), such that if the user subsequently views or accesses the document 104, the form API 128 may automatically populate or configure the form GUI elements within the body of the document 105 in accordance with the user's previously submitted response data (e.g., by populating text boxes with the user's previously input response values, selecting radio buttons previously selected by the user, populating a drop-down menu to the user's previously selected menu item, and the like). Thus, an individual user's version of the document 105 may be effectively synchronized with their response data entry maintained in the spreadsheet database 130.

Still referring to FIG. 1, similar to the document database 104, the spreadsheet database 130 stores or otherwise maintains electronic spreadsheet files 132 for viewing or editing with the spreadsheet application supported by the spreadsheet application platform 126. The spreadsheet files 132 may be maintained using document objects maintained in a database table having rows or entries corresponding to respective instances of spreadsheets and fields or columns containing the data associated with a respective spreadsheet, such as, for example, indicia of the document 105 and/or form field metadata 108 associated with the respective spreadsheet 132, the user's assigned to or otherwise permitted to view the respective spreadsheet 132 (e.g., the user that created the form). In exemplary embodiments, upon creation of a form, the form API 128 automatically commands, signals, or otherwise instructs the spreadsheet application platform 126 to create a new spreadsheet 132 to be associated with the newly created form within the particular document 105. In this regard, the form API 128 provides information pertaining to the various user-defined fields of the form, such that the columns (or alternatively rows) of the newly created spreadsheet 132 correspond to the fields of the form for which user responses are to be collected, with the rows (or alternatively columns) of the spreadsheet 132 corresponding to the individual respondents submitting response data 134 via the form.

When an individual submits response data via the form within the word processing application, the form API 128 automatically transmits or otherwise provides the user input response values for the various form fields to the spreadsheet application platform 126 along with the user identifier or other identification information for the user. The form API 128 automatically commands, signals, or otherwise instructs the spreadsheet application platform 126 to create a new row (or alternatively column) in the spreadsheet 132 having the user identifier or other identification information associated therewith before populating the columns (or alternatively rows) of that user's response entry in the spreadsheet 132 with user's input response values for the various fields of the form. In this manner, the response data 134 maintained by the spreadsheet 132 associated with the form may be dynamically updated substantially in real-time as respondents interact with the form integrated into the document 105. The user who created the form, or other users having appropriate roles or permissions, may then utilize the spreadsheet 132 associated with the form to review, track, or otherwise analyze the response data 134 in a conventional manner using conventional spreadsheet functionality or techniques. For example, the user who created the form may utilize the spreadsheet application provided by the spreadsheet application platform 126 to view the entries in the spreadsheet, add charts, graphs or other visualizations to the spreadsheet, and/or the like.

Still referring to FIG. 1, in one or more embodiments, the form API 128 may support inserting or otherwise including references to data from an external source 110 within the form. For example, a user could add a picklist or other menu GUI element to the form and populate the menu with hyperlinks or references to one or more data records maintained at an external source 110, which may be utilized by the word processing application platform 124 to retrieve and incorporate data from an external source 110 to populate the form GUI element. In one or more embodiments, the external source 110 may be realized as a database system including another instance of an application server 112 and a database 114, where the GUI elements are populated using hyperlinks, query statements, or other references to database objects 118 maintained in the database 114. The application server 112 similarly represents a server computing device, server computing system or another combination of processing logic, circuitry, hardware, and/or other components configured to create, generate, or otherwise facilitate an application platform 116 that allows interaction with the database 114, which may store or otherwise maintain data for integration with or invocation by the virtual application. In this regard, the form API 128 may be configured to contact the application server 112 and interact with the application platform 116 to retrieve or otherwise obtain data for one or more fields associated with an object 118 in the database 114. Thus, a form GUI element configured by the user may reference a field of an external database object 118, with the field metadata 108 for that form GUI element including a reference to that field of the database object 118 (e.g., a direct link to or query for data or content at a particular location at the database system 110) or other data or information that allows the form API 128 to subsequently query or otherwise retrieve the referenced data from the database object 118 via the application platform 116 (e.g., a hyperlink, an Internet Protocol (IP) address, or other address suitable for retrieving data via a network 103). In various embodiments, the form field metadata 108 or the form response data 134 may leverage or otherwise be integrated with data or features provided by the database system 110, such as, for example, bar charts, pie charts, or other reports or analytics that are capable of integrating the field-related data 108, 134 with data maintained in the database 114 or vice versa to generate real-time visualizations. In this regard, in some embodiments, the response data 134 may be exported to the database system 110 for storage in corresponding database objects 118 in the database 114 to support visualizations generated by the application platform 116 within the client application 107 (e.g., via the form API 128 or application platforms 124, 126). In one or more embodiments, the database system 110 is realized as a multi-tenant database system.

Figure 2:
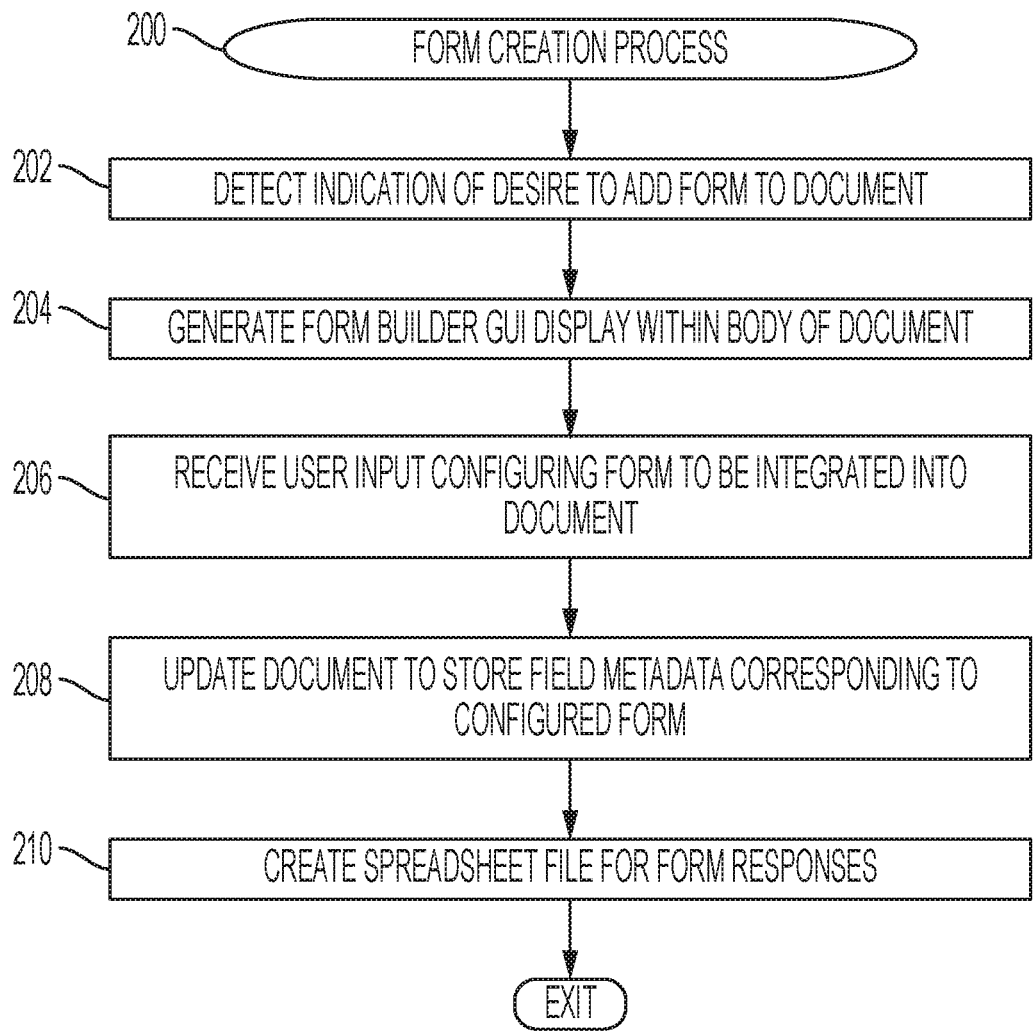
FIG. 2 is a flow diagram of an exemplary form creation process suitable for implementation in the computing system of FIG. 1 in accordance with one or more embodiments.

FIG. 2 depicts an exemplary embodiment of a form creation process 200 suitable for implementation in a computing system to enable integrating or incorporating a form into a document or other dynamic and collaborative resource. For illustrative purposes, the following description may refer to elements mentioned above in connection with FIG. 1. In this regard, while portions of the form creation process 200 may be performed by different elements of the computing system 100, for purposes of explanation, the subject matter is described herein in the context of the form creation process 200 being primarily performed by the word processing application platform 124 and/or form API 128 that are implemented or executed by the processing system 120 at the resource server 102. It should be appreciated that the form creation process 200 may include any number of additional or alternative tasks, the tasks need not be performed in the illustrated order and/or the tasks may be performed concurrently, and/or the form creation process 200 may be incorporated into a more comprehensive procedure or process having additional functionality not described in detail herein. Moreover, one or more of the tasks shown and described in the context of FIG. 2 could be omitted from a practical embodiment of the form creation process 200 as long as the intended overall functionality remains intact. For purposes of explanation, the form creation process 200 will be described primarily in the context of the computing system of FIG. 1 with the resource being realized as a document file residing at the document database. That said, the form creation process 200 is not necessarily limited to documents, and could be implemented in an equivalent manner for other types of files or resources to incorporate or integrate a form into the visualization of the resource content.

Referring to FIG. 2, and with continued reference to FIG. 1, the form creation process 200 begins by detecting or otherwise identifying a user indication of a desire to add a form to a document (task 202). For example, a user of the client device 106 may utilize the word processing application supported by the word processing application platform 124 to create a new document or select or otherwise indicate an existing document 105 in the document database 104 for presentation. For an existing document, the word processing application queries or otherwise accesses the document database 104 to retrieve the text or other content corresponding to the body of the document 105 from the document database 104. Thereafter, the word processing application supported by the word processing application platform 124 continually analyzes user input received within the document to detect or identify a desired to add a form within the body of the document. For example, the word processing application supported by the word processing application platform 124 may continually parse the alphanumeric characters being added to the body of the document to identify a "mention" or other predefined markup text (e.g., a user @ mentioning the form API 128 by typing "@Form") within the body of the document that triggers initiation or execution of the form API 128.

In response to identifying the user indication to add a form to the document, the form creation process 200 generates or otherwise provides a GUI display within the body of the document that allows the user to configure the form to be integrated into the document (task 204). For example, a form builder GUI display may be generated within the body of the document, with the form builder GUI display including GUI elements that allow the user to define or otherwise configure the form being added to the document. In this regard, the user utilizes the form builder GUI display to add GUI elements for receiving response data for different fields of the form, define the fields associated with the GUI elements, and configure the GUI elements to define potential input response values for the respective fields. The form creation process 200 receives the user input configuring or otherwise defining the structure and other metadata of the form to be added to the document via the form builder GUI display and stores or otherwise maintains the form field metadata in association with the document (tasks 206, 208). In this regard, the form API 128 updates the document 105 to persistently store the field metadata 108, for example, by encoding or otherwise integrating the form field metadata 108 into the body of the document 105.

In exemplary embodiments, the form creation process 200 also automatically creates a spreadsheet file for receiving and storing form responses (task 210). For example, using one or more identifiers associated with the document 105 and/or the user of the client device 106, the form API 128 interacts with the spreadsheet application platform 126 to create a new spreadsheet file database object 132 in the spreadsheet database 130 that is associated with the document 105 in the document database 104, for example, by setting the value of one or more fields of the spreadsheet database object 132 to be equal to the document identifier, user identifier, and/or the like to maintain an association between the spreadsheet 132 and the document 105. Additionally, the form API 128 may also provide the spreadsheet application platform 126 with a subset of the form field metadata 108 for use in configuring the headers for the columns of the new spreadsheet 132 in accordance with the fields defined by the user.

Figure 4:
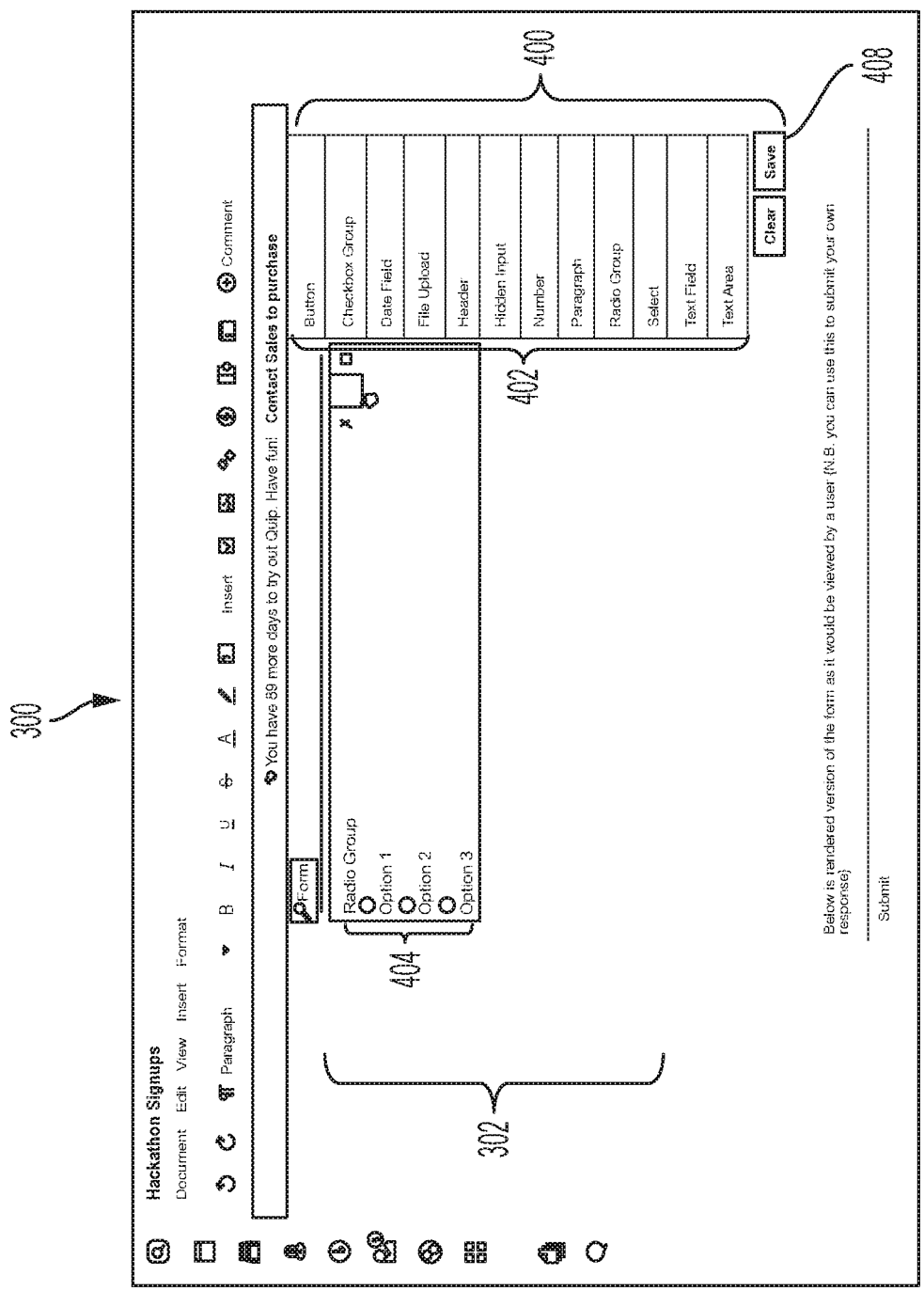
Figure 5:
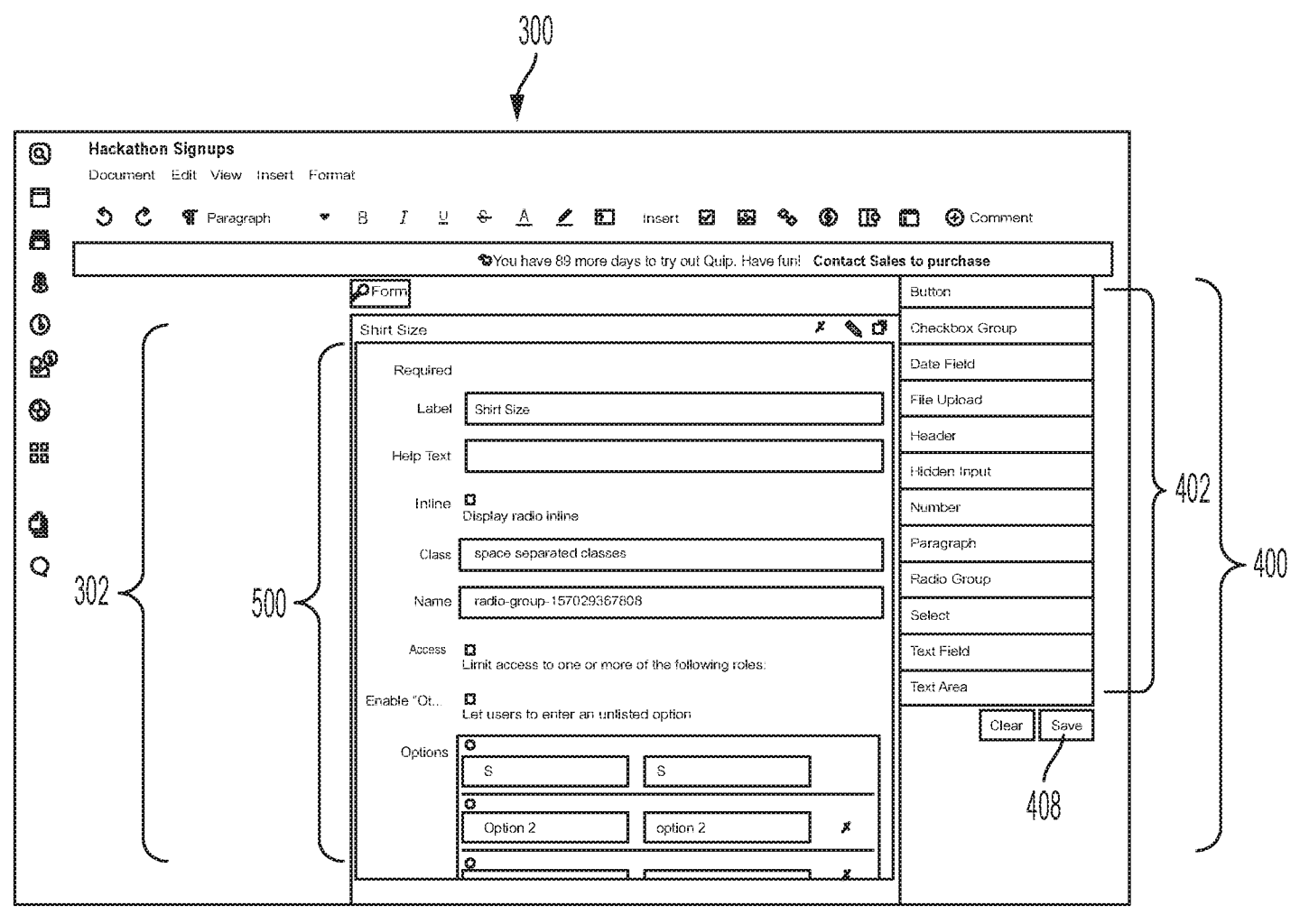

FIGS. 3-5 depict a sequence of GUI displays that may be presented by the word processing application platform 124 within the client application 107 on the client device 106 in connection with the form creation process 200 of FIG. 2.

FIG. 3 depicts a word processing GUI display 300 that may be provided by an instance of the word processing application supported by the word processing application platform 124 within the client application 107 at the client device 106. An editor region 302 of the word processing GUI display 300 includes a graphical representation of the content of the body of the document 105. In this regard, FIG. 3 depicts a state of the word processing GUI display 300 in response to the word processing application platform 124 detecting markup text 304 ("@Form") input by the user within the body of the document 105 to indicate the desire to add a form to the document 105 (e.g., task 202). In response, the word processing application platform 124 generates a pop-up window 305 within the editor region 302 that includes a selectable GUI element 306, such as a button, that when selected, results the word processing application platform 124 initiating execution of the form API 128.

Referring now to FIG. 4 with continued reference to FIGS. 1-3, when the form API 128 is executed to create a form, the form API 128 updates the word processing GUI display 300 to include a form builder GUI display 400 within the editor region 302 (e.g., using a pop-up window or similar GUI element overlying the body of the document). The form builder GUI display 400 includes a menu region 402 including a list of selectable GUI elements corresponding to the different types of GUI elements that can be added to the form. FIG. 4 depicts a scenario where the user selects the "Radio Group" GUI element from the menu region 402, which, in turn, results in the form API 128 updating a body region 404 of the form builder GUI display 400 to include additional GUI elements that may be utilized by the user to configure the number of selectable options to be associated with the radio group to be added to the form.

Referring to FIG. 5, after the user configures the desired number of selectable options for the radio group, the form API 128 generates an updated body region 500 of the form builder GUI display 400 that includes additional GUI elements that are manipulable or otherwise selectable by the user to further define the radio group. For example, the updated body region 500 includes a text box that allows the user to define a title or header for the field (e.g., "Shirt Size") to be associated with the radio group, along with additional GUI elements that allow the user to define or otherwise configure the selectable options for the radio group (e.g., shirt size options) and other attributes, options or parameters of the radio group GUI element to be added to the form. Once the user has configured the radio group GUI element and potentially other GUI elements to be added to the form, the user may select a button or similar GUI element 408 provided by the form builder GUI display 400 to save the corresponding field metadata 108 to the database 104. In this regard, the field metadata 108 includes information that characterizes or otherwise defines the name or designation of the respective form field(s) added to the document 105 (e.g., Shirt Size), the type of GUI element associated with the respective form field (e.g., radio group), the potential response input values for the form field (e.g., small, medium, or large), and potentially other data that defines the structure or functionality of the respective form field GUI element. The form field metadata 108 may also include information defining the placement or location of the respective form field GUI element within the body of the document 105, which may be relative to the location where the markup text 304 was provided within the document. In this regard, the location of the markup text 304 within the body of the document 105 may effectively anchor the configured form GUI elements to that particular location within the document 105.

As described above, upon saving the configured form metadata 108 to the document database 104, in exemplary embodiments, the form API 128 also automatically commands, signals, or otherwise instructs the spreadsheet application platform 126 to create a corresponding spreadsheet 132 in the spreadsheet database 130. In this regard, a spreadsheet database object 132 is created that is associated with the name or title of the document 105 that includes the form (e.g., "Hackathon Signups"), and with column headers that correspond to the names of the various fields of the form (e.g., "Shirt Size."). Although not illustrated, in practice, the word processing application platform 124 may also generate or otherwise provide a pop-up window or another GUI display that includes GUI elements that allow the user who created the form to send instances of the document 105 to potential respondents or to add additional users having designated roles or permissions with respect to the document 105 that allow those users to view, edit, modify, or otherwise collaborate on the form within the document 105.

Figure 6:
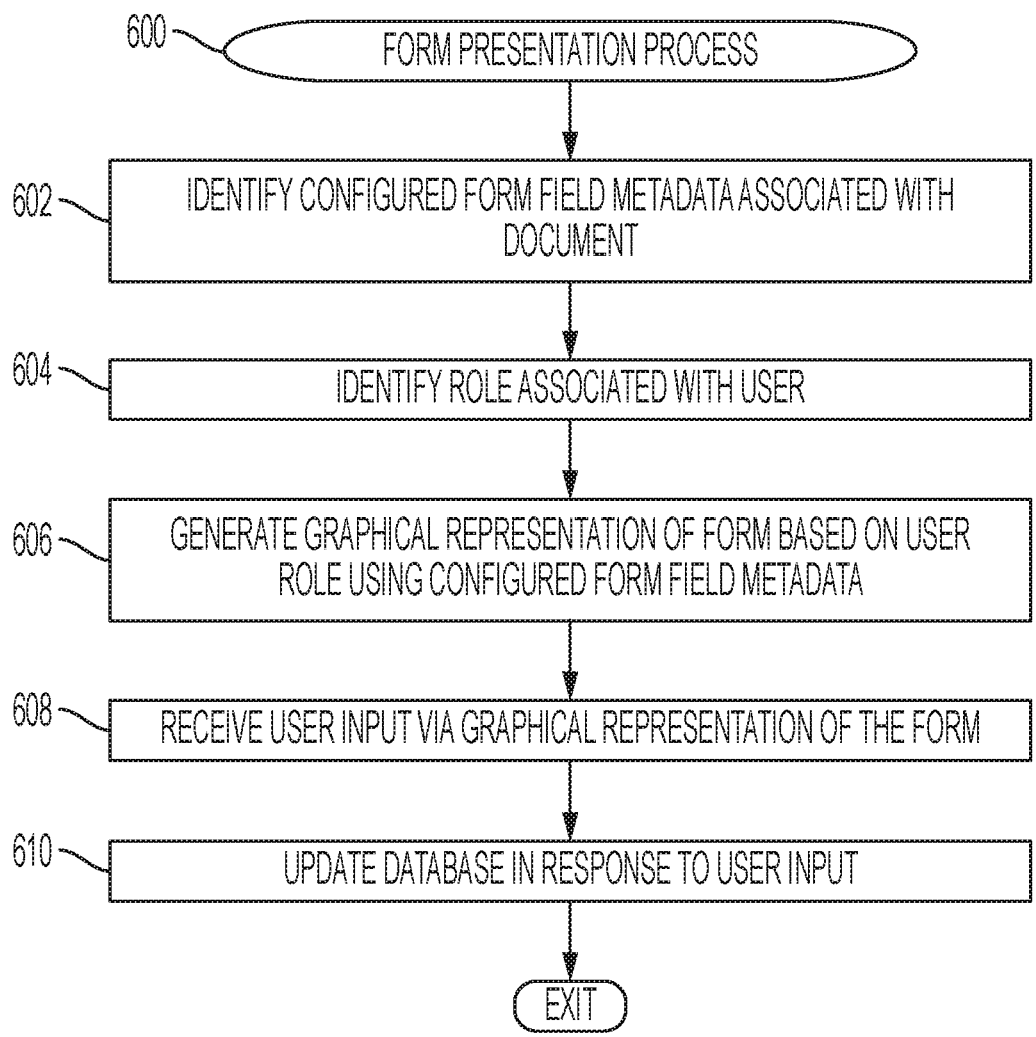
FIG. 6 is a flow diagram of an exemplary form presentation process suitable for implementation in the computing system of FIG. 1 in accordance with one or more embodiments.

FIG. 6 depicts an exemplary embodiment of a form presentation process 600 suitable for implementation in a computing system in concert with the form creation process 200 of FIG. 2. For illustrative purposes, the following description may refer to elements mentioned above in connection with FIG. 1. In this regard, while portions of the form presentation process 600 may be performed by different elements of the computing system 100, for purposes of explanation, the subject matter is described herein in the context of the form presentation process 600 being primarily performed by the word processing application platform 124 and/or form API 128 that are implemented or executed by the processing system 120 at the resource server 102. It should be appreciated that the form presentation process 600 may include any number of additional or alternative tasks, the tasks need not be performed in the illustrated order and/or the tasks may be performed concurrently, and/or the form presentation process 600 may be incorporated into a more comprehensive procedure or process having additional functionality not described in detail herein. Moreover, one or more of the tasks shown and described in the context of FIG. 6 could be omitted from a practical embodiment of the form presentation process 600 as long as the intended overall functionality remains intact. Similar to FIG. 2, it should be noted that although the form presentation process 600 will be described primarily in the context a document file, the form presentation process 600 is not necessarily limited to documents, and could be implemented in an equivalent manner for other types of files or resources to incorporate or integrate a form into the visualization of the resource content.

Referring to FIG. 6, with continued reference to FIGS. 1-5, the form presentation process 600 is initiated or otherwise triggered when the word processing application platform 124 detects form field metadata 108 or another reference to metadata for a configured form that is associated with the document 105 being presented. For example, when the word processing application platform 124 detects the markup text 304 (e.g., "@Form") or other encoding indicating the existence of configured form field metadata 108 associated with the document 105 during rendering of the body of the document 105, the word processing application platform 124 automatically triggers or otherwise initiates execution of the form API 128 to support the form presentation process 600.

The form presentation process 600 identifies or otherwise obtains the configured form field metadata associated with the document, identifies or otherwise determines a role associated with a user viewing the document, and then generates a graphical representation of the form within the document using the configured form field metadata in accordance with the user's role (tasks 602, 604, 606). In this regard, when the form API 128 identifies the user of the client device 106 as an intended recipient or respondent for the form, the form API 128 automatically generates a graphical representation of the configured form within the body of the document 105 using the configured field metadata 108. A respondent may then interact with the configured GUI elements of the form to provide responsive input values within the document 105. Conversely, if the user of the client device 106 has editing privileges with respect to the document 105 or form, the form API 128 automatically generates an instance of the form builder GUI display within the body of the document 105, with the form builder GUI display being automatically populated to reflect an in-progress form using the configured field metadata 108. The user may then add additional GUI elements or fields to the form or modify existing fields in accordance with the form creation process 200 described above.

The form presentation process 600 continues by receiving or otherwise obtaining input data from the user and updating at least one of the databases to reflect the user input (tasks 608, 610). In this regard, the form API 128 may update the databases 104, 130 differently depending on the role of the user and the corresponding nature of the input data received. For example, when a respondent interacts with the configured form GUI elements to input response values for the different fields of the form, the form API 128 interacts with the spreadsheet application platform 126 to create an entry (or row) associated with that respondent in the spreadsheet 132 associated with the document 105 and then provides the input response values to the spreadsheet application platform 126 for storage in the appropriate columns of that user's entry in the spreadsheet 132. Additionally, in one or more embodiments, the form API 128 may update the document database 104 to include indicia that the responding user has completed the form, such that subsequent attempts to view the document 105 by that user will result in the form API 128 providing graphical indicia that the form has been completed in lieu of generating the configured form GUI elements. Conversely, when another user collaborating on the document 105 interacts with the form builder GUI display to modify previously-configured form GUI elements or add newly configured form GUI elements to the form, the form API 128 updates the configured form field metadata 108 to reflect the additions or changes by the user. Additionally, in some embodiments, the form API 128 interacts with the spreadsheet application platform 126 update the column headers of the spreadsheet 132 associated with the document 105 to reflect the current version of the form. In this regard, in some embodiments, to support different versions of the form, the form API 128 may create a new sheet within the existing spreadsheet 132 for responses received via the newly modified version of the form, or alternatively, an additional spreadsheet 132 may be created for each different version of the form.

Figure 7:
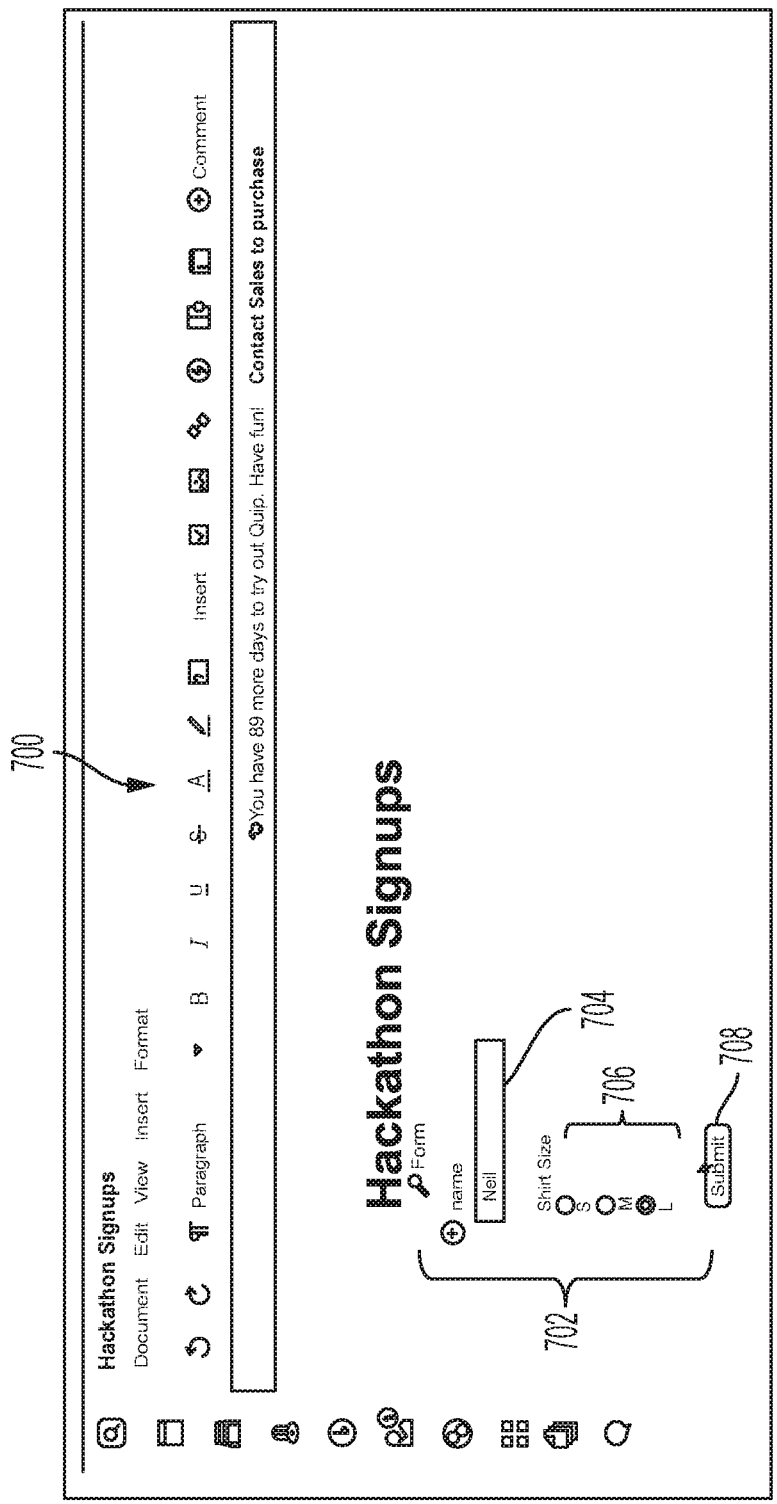
FIG. 7 depicts an exemplary GUI display illustrating the form presentation process of FIG. 6 in accordance with one or more exemplary embodiments.

FIG. 7 depicts an exemplary word processing application GUI display 700 that may be presented for a recipient or respondent viewing the document 105 configured as described above in the context of FIGS. 3-5 in connection with the form presentation process 600 of FIG. 6. In this regard, FIG. 7 depicts the state of a word processing GUI display 700 provided to a potential form respondent by an instance of the word processing application supported by the word processing application platform 124 within a client application 107. The word processing GUI display 700 includes a graphical representation of the content of the body of the document 105, and in response to the word processing application platform 124 detecting markup text or configured form field metadata 108 within the body of the document 105, the word processing application platform 124 initiating execution of the form API 128 which generates the configured form GUI display 702. Based on the field metadata 108, the form API 128 generates a text box 704 for receiving a user input response value for a name field of the form followed by a radio group 706 that includes radio buttons for the different potential user response values for the shirt size field. After the respondent interacts with the form GUI display 702 to provide an input response value for the respondent's name (e.g., "Neil") via the text box 704 and a desired shirt size (e.g., large or "L"), the respondent may select a "Submit" button or similar GUI element 708 to confirm and save the response data. In response to selection of the button 708, the form API 128 interacts with the spreadsheet application platform 126 to create a new entry in the spreadsheet 132 for a respondent with a response value for the name field (or column) equal to "Neil" and a response value for the shirt size field (or column) equal to "L."

Figure 8:
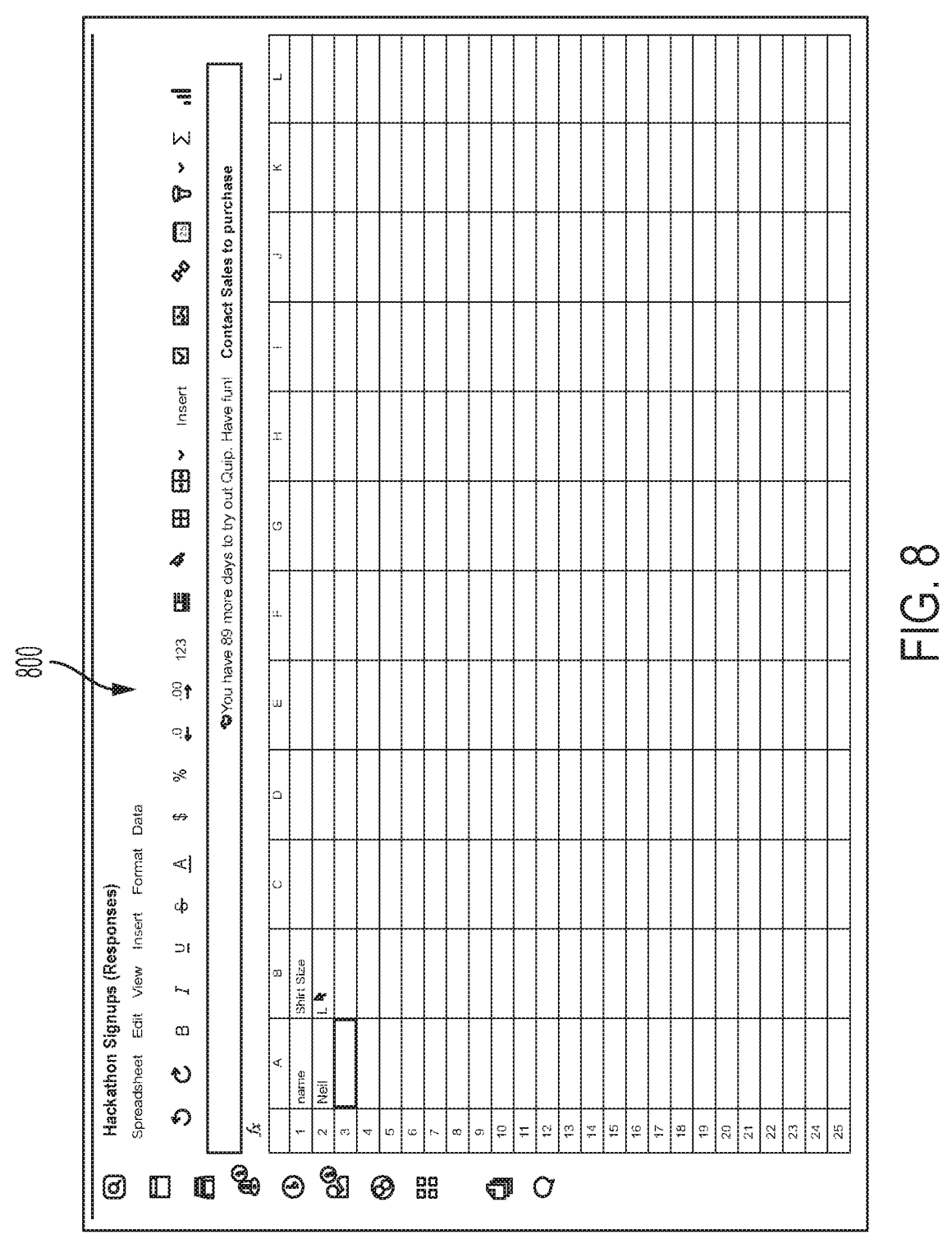

FIG. 8 depicts a spreadsheet GUI display 800 that may be provided, by an instance of the spreadsheet application supported by the spreadsheet application platform 126, within a client application 107 at a client device 106 associated with the owner or creator of the document 105, or another user with a role or permissions for the document 105 that allows for form response data to be viewed. In this regard, with reference to FIGS. 3-5 and 7, the spreadsheet GUI display 800 depicts the spreadsheet 132 after the form presentation process 600 updates the spreadsheet 132 to include the response data received for the respondent named Neil. As illustrated, the cell corresponding to the name field (or column) of the entry includes the input response value of "Neil" and the cell corresponding to the shirt size field (or column) of the entry includes the input response value of "L" for large. In this regard, the spreadsheet 132 may be dynamically updated and synchronized with responses received for the form via the document 105.

Figure 9:
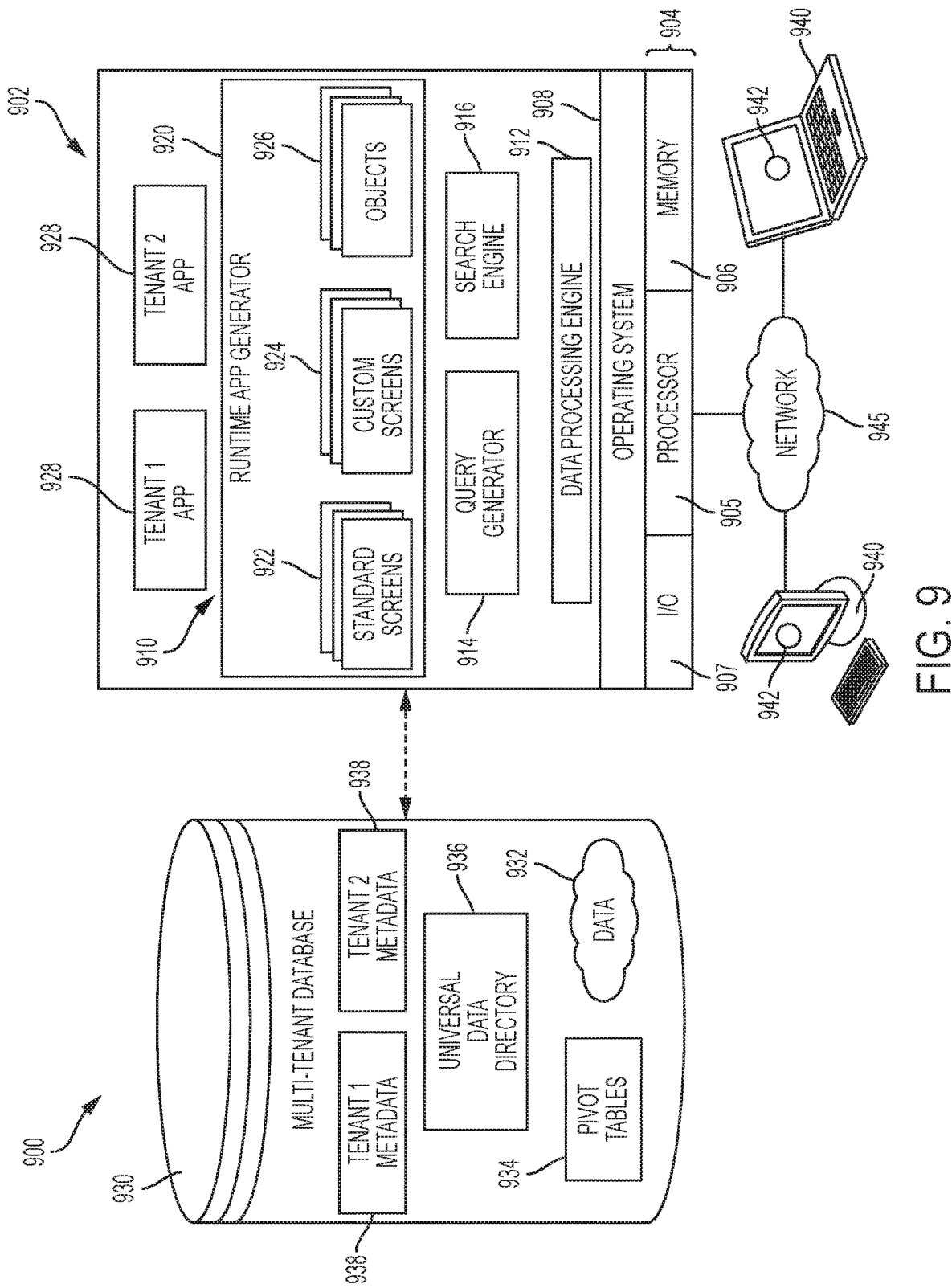
FIG. 9 is a block diagram of an exemplary multi-tenant system suitable for use with the computing system of FIG. 1 in accordance with one or more embodiments.

FIG. 9 depicts an exemplary embodiment of an on-demand multi-tenant database system 900 suitable for use in the computing system 100 of FIG. 1 in conjunction with the subject matter described herein. For example, the external system 110 could be realized as the on-demand multi-tenant database system 900, with the external form or document content being data 932 retrieved from the database 930 (e.g., database 114) via the application platform 910 (e.g., application platform 116) provided by the server 902 (e.g., application server 112). In various embodiments, the resource management system 101 could similarly be realized an on-demand multi-tenant database system 900, with the server 902 (e.g., resource server 102) supporting an on-demand multi-tenant document database 930 (e.g., document database 104 and/or spreadsheet database 130).

The illustrated multi-tenant system 900 of FIG. 9 includes a server 902 that dynamically creates and supports virtual applications 928 based upon data 932 from a common database 930 that is shared between multiple tenants, alternatively referred to herein as a multi-tenant database. Data and services generated by the virtual applications 928 are provided via a network 945 (e.g., network 103) to any number of client devices 940 (e.g., client device 106), as desired. Each virtual application 928 is suitably generated at run-time (or on-demand) using a common application platform 910 that securely provides access to the data 932 in the database 930 for each of the various tenants subscribing to the multi-tenant system 900. In accordance with one non-limiting example, the multi-tenant system 900 is implemented in the form of an on-demand multi-tenant customer relationship management (CRM) system that can support any number of authenticated users of multiple tenants.

As used herein, a "tenant" should be understood as referring to a group of one or more users that shares access to common subset of the data within the multi-tenant database 930. In this regard, each tenant includes one or more users associated with, assigned to, or otherwise belonging to that respective tenant. To put it another way, each respective user within the multi-tenant system 900 is associated with, assigned to, or otherwise belongs to a particular tenant of the plurality of tenants supported by the multi-tenant system 900. Tenants may represent customers, customer departments, business or legal organizations, and/or any other entities that maintain data for particular sets of users within the multi-tenant system 900 (i.e., in the multi-tenant database 930). For example, the application server 902 may be associated with one or more tenants supported by the multi-tenant system 900. Although multiple tenants may share access to the server 902 and the database 930, the particular data and services provided from the server 902 to each tenant can be securely isolated from those provided to other tenants (e.g., by restricting other tenants from accessing a particular tenant's data using that tenant's unique organization identifier as a filtering criterion). The multi-tenant architecture therefore allows different sets of users to share functionality and hardware resources without necessarily sharing any of the data 932 belonging to or otherwise associated with other tenants.

The multi-tenant database 930 is any sort of repository or other data storage system capable of storing and managing the data 932 associated with any number of tenants. The database 930 may be implemented using any type of conventional database server hardware. In various embodiments, the database 930 shares processing hardware 904 with the server 902. In other embodiments, the database 930 is implemented using separate physical and/or virtual database server hardware that communicates with the server 902 to perform the various functions described herein. In an exemplary embodiment, the database 930 includes a database management system or other equivalent software capable of determining an optimal query plan for retrieving and providing a particular subset of the data 932 to an instance of virtual application 928 in response to a query initiated or otherwise provided by a virtual application 928. The multi-tenant database 930 may alternatively be referred to herein as an on-demand database, in that the multi-tenant database 930 provides (or is available to provide) data at run-time to on-demand virtual applications 928 generated by the application platform 910.

In practice, the data 932 may be organized and formatted in any manner to support the application platform 910. In various embodiments, the data 932 is suitably organized into a relatively small number of large data tables to maintain a semi-amorphous "heap"-type format. The data 932 can then be organized as needed for a particular virtual application 928. In various embodiments, conventional data relationships are established using any number of pivot tables 934 that establish indexing, uniqueness, relationships between entities, and/or other aspects of conventional database organization as desired. Further data manipulation and report formatting is generally performed at run-time using a variety of metadata constructs. Metadata within a universal data directory (UDD) 936, for example, can be used to describe any number of forms, reports, workflows, user access privileges, business logic and other constructs that are common to multiple tenants. Tenant-specific formatting, functions and other constructs may be maintained as tenant-specific metadata 938 for each tenant, as desired. Rather than forcing the data 932 into an inflexible global structure that is common to all tenants and applications, the database 930 is organized to be relatively amorphous, with the pivot tables 934 and the metadata 938 providing additional structure on an as-needed basis. To that end, the application platform 910 suitably uses the pivot tables 934 and/or the metadata 938 to generate "virtual" components of the virtual applications 928 to logically obtain, process, and present the relatively amorphous data 932 from the database 930.

Still referring to FIG. 9, the server 902 is implemented using one or more actual and/or virtual computing systems that collectively provide the dynamic application platform 910 for generating the virtual applications 928. For example, the server 902 may be implemented using a cluster of actual and/or virtual servers operating in conjunction with each other, typically in association with conventional network communications, cluster management, load balancing and other features as appropriate. The server 902 operates with any sort of conventional processing hardware 904, such as a processor 905, memory 906, input/output features 907 and the like. The input/output features 907 generally represent the interface(s) to networks (e.g., to the network 945, or any other local area, wide area or other network), mass storage, display devices, data entry devices and/or the like. The processor 905 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 906 represents any non-transitory short or long term storage or other computer-readable media capable of storing programming instructions for execution on the processor 905, including any sort of random access memory (RAM), read only memory (ROM), flash memory, magnetic or optical mass storage, and/or the like. The computer-executable programming instructions, when read and executed by the server 902 and/or processor 905, cause the server 902 and/or processor 905 to create, generate, or otherwise facilitate the application platform 910 and/or virtual applications 928 and perform one or more additional tasks, operations, functions, and/or processes described herein. It should be noted that the memory 906 represents one suitable implementation of such computer-readable media, and alternatively or additionally, the server 902 could receive and cooperate with external computer-readable media that is realized as a portable or mobile component or application platform, e.g., a portable hard drive, a USB flash drive, an optical disc, or the like.

The application platform 910 is any sort of software application or other data processing engine that generates the virtual applications 928 that provide data and/or services to the client devices 940. In a typical embodiment, the application platform 910 gains access to processing resources, communications interfaces and other features of the processing hardware 904 using any sort of conventional or proprietary operating system 908. The virtual applications 928 are typically generated at run-time in response to input received from the client devices 940. For the illustrated embodiment, the application platform 910 includes a bulk data processing engine 912, a query generator 914, a search engine 916 that provides text indexing and other search functionality, and a runtime application generator 920. Each of these features may be implemented as a separate process or other module, and many equivalent embodiments could include different and/or additional features, components or other modules as desired.

The runtime application generator 920 dynamically builds and executes the virtual applications 928 in response to specific requests received from the client devices 940. The virtual applications 928 are typically constructed in accordance with the tenant-specific metadata 938, which describes the particular tables, reports, interfaces and/or other features of the particular application 928. In various embodiments, each virtual application 928 generates dynamic web content that can be served to a browser or other client program 942 associated with its client device 940, as appropriate.

The runtime application generator 920 suitably interacts with the query generator 914 to efficiently obtain multi-tenant data 932 from the database 930 as needed in response to input queries initiated or otherwise provided by users of the client devices 940. In a typical embodiment, the query generator 914 considers the identity of the user requesting a particular function (along with the user's associated tenant), and then builds and executes queries to the database 930 using system-wide metadata 936, tenant specific metadata 938, pivot tables 934, and/or any other available resources. The query generator 914 in this example therefore maintains security of the common database 930 by ensuring that queries are consistent with access privileges granted to the user and/or tenant that initiated the request. In this manner, the query generator 914 suitably obtains requested subsets of data 932 accessible to a user and/or tenant from the database 930 as needed to populate the tables, reports or other features of the particular virtual application 928 for that user and/or tenant.

Still referring to FIG. 9, the data processing engine 912 performs bulk processing operations on the data 932 such as uploads or downloads, updates, online transaction processing, and/or the like. In many embodiments, less urgent bulk processing of the data 932 can be scheduled to occur as processing resources become available, thereby giving priority to more urgent data processing by the query generator 914, the search engine 916, the virtual applications 928, etc.

In exemplary embodiments, the application platform 910 is utilized to create and/or generate data-driven virtual applications 928 for the tenants that they support. Such virtual applications 928 may make use of interface features such as custom (or tenant-specific) screens 924, standard (or universal) screens 922 or the like. Any number of custom and/or standard objects 926 may also be available for integration into tenant-developed virtual applications 928. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. For example, a virtual CRM application may utilize standard objects 926 such as "account" objects, "opportunity" objects, "contact" objects, or the like. The data 932 associated with each virtual application 928 is provided to the database 930, as appropriate, and stored until it is requested or is otherwise needed, along with the metadata 938 that describes the particular features (e.g., reports, tables, functions, objects, fields, formulas, code, etc.) of that particular virtual application 928. For example, a virtual application 928 may include a number of objects 926 accessible to a tenant, wherein for each object 926 accessible to the tenant, information pertaining to its object type along with values for various fields associated with that respective object type are maintained as metadata 938 in the database 930. In this regard, the object type defines the structure (e.g., the formatting, functions and other constructs) of each respective object 926 and the various fields associated therewith.

Still referring to FIG. 9, the data and services provided by the server 902 can be retrieved using any sort of personal computer, mobile telephone, tablet or other network-enabled client device 940 on the network 945. In an exemplary embodiment, the client device 940 includes a display device, such as a monitor, screen, or another conventional electronic display capable of graphically presenting data and/or information retrieved from the multi-tenant database 930. Typically, the user operates a conventional browser application or other client program 942 (e.g., client application 107) executed by the client device 940 to contact the server 902 via the network 945 using a networking protocol, such as the hypertext transport protocol (HTTP) or the like. The user typically authenticates his or her identity to the server 902 to obtain a session identifier ("SessionID") that identifies the user in subsequent communications with the server 902. When the identified user requests access to a virtual application 928, the runtime application generator 920 suitably creates the application at run time based upon the metadata 938, as appropriate. As noted above, the virtual application 928 may contain Java, ActiveX, or other content that can be presented using conventional client software running on the client device 940; other embodiments may simply provide dynamic web or other content that can be presented and viewed by the user, as desired.

Referring again to FIG. 1 with reference to FIG. 9, in one or more exemplary embodiments, the server 902 and/or the application platform 910 supports the form creation process 200 to allow the word processing application platform 124 to provide authentication information and additional information corresponding to the referenced database object 118 that allows the application platform 910 to authenticate and execute a query to retrieve the field(s) of data 932 associated with an object 928 corresponding to the referenced location from the database 930 and provide the resulting data back to the word processing application 124 via the network 945. The word processing application 124 then generates a graphical representation of the external content retrieved from the database 930 within a word processor GUI display at the client device 106, as described above.

In one embodiment, the retrieved external data is realized as a field of data 932 associated with an instance of an object 928 that is automatically generated or created by the application platform 910 based on one or more other fields of data 932 associated with that object 928. For example, the referenced location could refer to a field for autogenerated text that summarizes or characterizes the values of other fields of that object 928. As another example, the referenced location could refer to a field for a chart, report, or other graphic that is automatically generated by the application platform 910 based on the values of other fields of that object 928. Thus, a document 105 hosted by the resource management system 101 could incorporate autogenerated summaries or reports of data maintained at another database system 110, 900 that are automatically generated by that database system 110, 900, and which can also be dynamically updated as described above. Accordingly, users can incorporate automatically generated and up-to-date or real-time external database data within documents 105 without having to manually update the summarizing text, transpose data, and/or the like.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to querying and other database functions, multi-tenancy, cloud computing, on-demand applications, querying, hyperlinks, word processing, spreadsheets, hosting, management and/or sharing of documents or other files, versioning, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first," "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another. In one or more exemplary embodiments, the subject matter described herein is implemented in conjunction with a virtual customer relationship management (CRM) application in a multi-tenant environment.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A method comprising:
   generating, by a word processing application platform at a server, a graphical representation of a document within an instance of a word processing application within a client application at a client device communicatively coupled to the server over a network;
   detecting, by the word processing application platform, markup text input by a user of the client device within a body of the document comprising an indication to add a form to the document;
   in response to the indication, initiating, by the word processing application platform, an application programming interface to generate a form builder graphical user interface display within the graphical representation of the document within the instance of the word processing application, wherein the form builder graphical user interface display comprises graphical user interface elements manipulable to define one or more fields of the form;
   receiving, by the word processing application platform, metadata defining the one or more fields of the form via the graphical user interface elements; and
   storing, by the word processing application platform, the metadata defining the one or more fields of the form in a database in association with a document object in the database, the document object corresponding to the document.

2. The method of claim 1, further comprising automatically creating, by the word processing application platform, a spreadsheet associated with the document for maintaining responses to the form.

3. The method of claim 2, further comprising:
   generating, by the word processing application platform, a configured form graphical user interface display within the body of an instance of the document, the configured form graphical user interface display including a second set of one or more graphical user interface elements configured in accordance with the metadata defining the one or more fields of the form;
   receiving, by the word processing application platform, input values for the one or more fields of the form via the second set of one or more graphical user interface elements; and
   storing, by the word processing application platform, the input values in the spreadsheet.

4. The method of claim 3, wherein:
   automatically creating the spreadsheet comprises the word processing application platform instructing a spreadsheet application platform to create a spreadsheet object for the spreadsheet associated with the document in a spreadsheet database; and
   storing the input values comprises the word processing application platform providing the input values to the spreadsheet application platform, wherein the spreadsheet application platform creates a new entry in the spreadsheet including the input values.

5. The method of claim 1, further comprising:
   identifying, by the word processing application platform, a role associated with a second user of a second client device; and
   generating, by the word processing application platform, a configured form graphical user interface display within the body of an instance of the document within a second client application at the second client device when the role corresponds to a recipient of the form, wherein the configured form graphical user interface display includes a second set of one or more graphical user interface elements configured in accordance with the metadata defining the one or more fields of the form.

6. The method of claim 1, further comprising:
   identifying, by the word processing application platform, a role associated with a user of a second client device; and
   generating, by the word processing application platform, the form builder graphical user interface display within the body of an instance of the document within a second client application at the second client device when the role indicates the user has permission to edit the form, wherein the form builder graphical user interface display includes a second set of one or more graphical user interface elements configured in accordance with the metadata defining the one or more fields of the form.

7. The method of claim 1, further comprising the word processing application platform automatically interacting with a spreadsheet application platform to create a spreadsheet object associated with the document in a spreadsheet database.

8. The method of claim 7, further comprising:
   generating, by the word processing application platform, a configured form graphical user interface display within a graphical representation of the document within a second instance of the word processing application within a second client application at a second client device, the configured form graphical user interface display including a second set of one or more graphical user interface elements configured in accordance with the metadata defining the one or more fields of the form;

receiving, by the word processing application platform, input values for the one or more fields of the form via the second set of one or more graphical user interface elements; and providing, by the word processing application platform, the input values to the spreadsheet application platform for creating an entry in the spreadsheet object to maintain the input values.

9. The method of claim 1, wherein:
storing the metadata comprises encoding the metadata defining the one or more fields of the form into a document file; and
the document object comprises the document file.

10. The method of claim 1, wherein the form builder graphical user interface display includes the graphical user interface elements manipulable to define a number and type of graphical user interface elements to be added to the form to receive user responses.

11. The method of claim 1, wherein storing the metadata comprises updating the document object in a document database to store the metadata in the document database such that the metadata is integrated with the body of the document.

12. The method of claim 1, wherein detecting the markup text comprises the word processing application platform parsing alphanumeric characters added to the body of the document to identify the markup text.

13. The method of claim 12, wherein the markup text input comprises @Form input into the body of the document.

14. The method of claim 1, wherein the form builder graphical user interface display includes a menu region including a list of selectable graphical user interface elements corresponding to different types of graphical user interface elements that can be added to the form.

15. A non-transitory computer-readable storage medium comprising having computer-executable instructions stored thereon that are configurable to cause a processing system to provide the word processing application platform and perform the method of claim 1.

16. A method comprising:
obtaining, by a word processing application platform at a server, a document object corresponding to a document from a database;
generating, by the word processing application platform, an instance of a word processing application comprising a graphical representation of the document within a client application on a client device communicatively coupled to the server over a network based at least in part on data associated with the document object;
identifying, by the word processing application platform, a form within a body of the document;
obtaining, by the word processing application platform, metadata defining fields of the form from the database;
generating, by the word processing application platform, a configured form graphical user interface display within the graphical representation of the document using the metadata, the configured form graphical user interface display including a graphical representation of one or more graphical user interface elements corresponding to the fields of the form;
receiving, by the word processing application platform, input values for the fields of the form via the one or more graphical user interface elements; and
creating, by the word processing application platform, an entry including the input values in a spreadsheet database object associated with the document object.

17. The method of claim 16, wherein identifying the form comprises detecting markup text within the body of the document.

18. The method of claim 17, further comprising the word processing application platform initiating a form application programming interface in response to detecting the markup text, wherein the form application programming interface obtains the metadata and generates the configured form graphical user interface display in accordance with the metadata.

19. The method of claim 16, further comprising identifying, by the word processing application platform, a role associated with a user of the client device, wherein the configured form graphical user interface display is influenced by the role associated with the user.

20. A computing system comprising:
data storage to maintain text corresponding to a body of a document associated with an electronic document file; and
a processor coupled to the data storage and a network to provide word processing application platform configurable to generate a graphical representation of the electronic document file within a word processing application at a client device communicatively coupled to the network, identify a user indication within the text corresponding to the body of the document to add a form to the document within the graphical representation of the document, generate a form building graphical user interface display within the graphical representation of the body of the document, receive metadata defining one or more fields of the form via the form building graphical user interface display, and store the metadata defining the one or more fields of the form in the data storage in association with the electronic document file, wherein the metadata is integrated with the text at a location within the body of the document corresponding to a location of the user indication.

* * * * *